T. Z. CARPENTER.
CHUCK FOR SCREW MACHINES.
APPLICATION FILED MAR. 10, 1913.
1,194,817.
Patented Aug. 15, 1916.
2 SHEETS—SHEET 1.
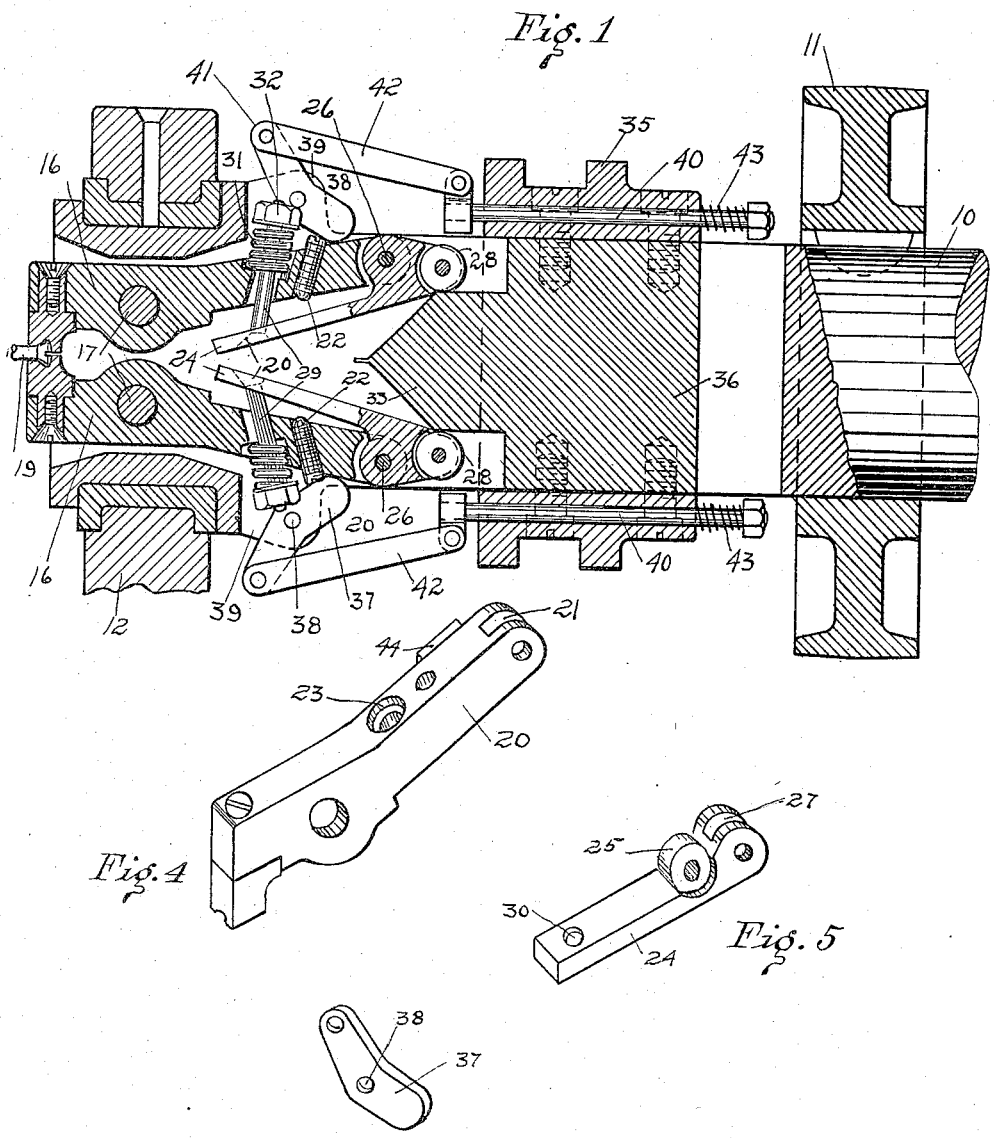
Witnesses
David Hill
E. J. Ogden
Inventor
TEUNAUSKI Z. CARPENTER.
By Howard E. Barlow
Attorney

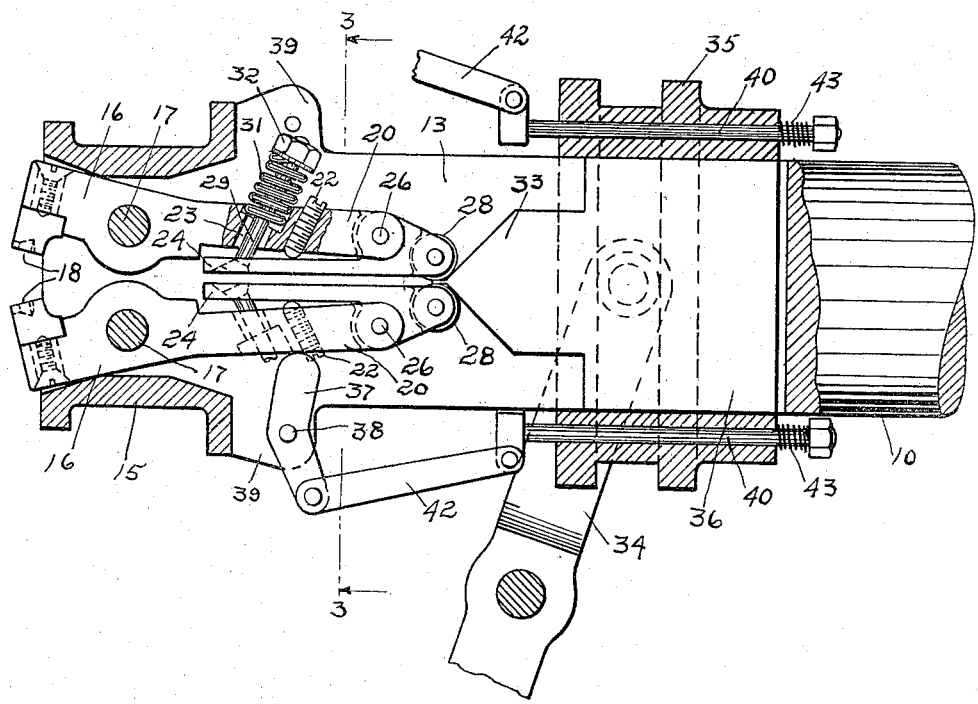
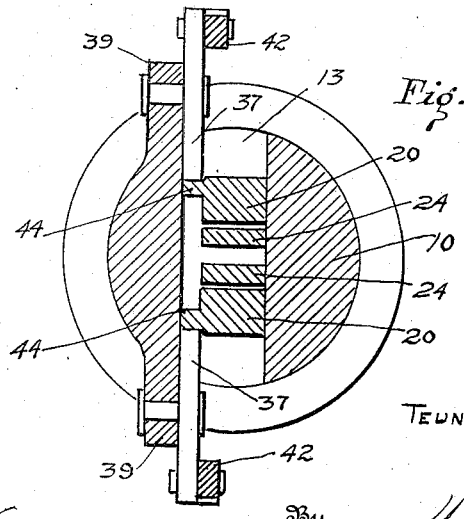

UNITED STATES PATENT OFFICE.

TEUNAUSKI Z. CARPENTER, OF PROVIDENCE, RHODE ISLAND, ASSIGNOR TO FEDERAL SCREW CORPORATION, OF PROVIDENCE, RHODE ISLAND, A CORPORATION OF RHODE ISLAND.

CHUCK FOR SCREW-MACHINES.

1,194,817.  Specification of Letters Patent.  Patented Aug. 15, 1916.

Application filed March 10, 1913.  Serial No. 753,161.

*To all whom it may concern:*

Be it known that I, TEUNAUSKI Z. CARPENTER, a citizen of the United States, and resident of the city of Providence, in the county of Providence and State of Rhode Island, have invented certain new and useful Improvements in Chucks for Screw-Machines, of which the following is a specification.

This invention relates to screw blank gripping jaws for screw threading machines, and has for its object to provide a pair of such jaws with improved means for automatically adjusting themselves to fit and grip screw blanks of varying sizes, said means including yieldable springs whose tension may be adjusted to regulate the gripping force of the jaws.

A further object of the invention is to provide means whereby the jaws will be quickly and positively opened after the threading operation has been completed.

A further object of the invention is to provide means for controlling the extent of opening of the jaws.

With these and other objects in view, the invention consists of certain novel features of construction, as will be more fully described and particularly pointed out in the appended claims.

Of the accompanying drawings: Figure 1— is a central longitudinal sectional view illustrating the jaws in closed position retaining a portion of a screw blank therein. Fig. 2— illustrates the jaws in open position with one of the opening levers removed and the other in operating position. Fig. 3— is a transverse section on line 3—3 of Fig. 2 illustrating the jaws mounted in the shaft and the cams for positively opening said jaws. Fig. 4— is a perspective view of one of the jaws. Fig. 5— is a perspective view of one of the levers pivoted to the jaw arm. Fig. 6— is a detail in perspective showing one of the jaw opening cams.

Referring to the drawings 10 designates the shaft which is continuously rotated through the pulley 11 by a belt, not shown, the forward bearing of said shaft being shown at 12 in Fig. 1. The center portion of this shaft is slotted longitudinally as at 13, see Fig. 3, and its forward end is grooved as at 15 to receive the bearing 12. In this forward end is pivoted a pair of jaw members 16 on the pins 17. The forward ends of these jaws are grooved or notched slightly as at 18 to receive the head of the screw 19, see Fig. 1, which is to be threaded by apparatus not shown. These jaws are each provided with a rearwardly extending arm 20, the same being slotted or forked at its end as at 21, see Fig. 4, and each arm is also provided with an adjustable screw 22, whose function is hereinafter described, and a hole 23 is formed therethrough for the reception of the spring controlled pin presently described. A lever 24 is provided with an upwardly extending boss 25 pivoted at 26 in the outer forked end of the jaw arm. The outer end of this lever is itself slotted or forked as at 27 for the reception of the friction roller 28. This lever then extends forward beneath the jaw arm 20 and is yieldably retained in position by means of the pin 29, the head of which is loosely held in the opening 30 in said lever, its body portion extending up through the opening 23 in the jaw arm and through a coil spring 31 and has a nut 32 threaded on its upper end whereby the tension of the spring, which is interposed between the nut and the arm, may be adjusted. In order to force these jaw arms apart for the purpose of closing the jaws themselves upon the screw blank, a wedge-shaped member 33 is provided which is caused to slide longitudinally in the groove portion 13 of the shaft by means of the fork 34, see Fig. 2, engaging the grooved collar 35, which latter is secured to the body 36 of this wedge-shape member and adapted to move longitudinally on the outside of said shaft.

As it is very desirable in order to facilitate the rapid working of the machine that the blank holding jaws should open quickly and release the screw as soon as the wedge block has been withdrawn from contact with the arms, I have provided a pair of cam members 37 pivoted at 38 to the ears 39 on the shaft, see Fig. 3, and have connected the outer end 41 of each to a rod 40 through a connector 42 and have mounted this rod to move longitudinally through a bearing in the grooved collar 35, the opposite end of the rod being provided with a coil spring 43 adapted to permit a yieldable endwise movement, whereby when the grooved collar with its wedge shape member is withdrawn, both of the cam members 37 simultaneously engage their laterally extending lips 44 on the jaw arms causing said jaws to immediately open and release the finished screw from its grip.

By my improved construction I am enabled by adjusting the nuts 41 to regulate the tension of the springs 31 and so regulate and adjust the biting force of the jaws to grip with a sufficient force heads of screws of slightly different diameters. Then again, by my improved construction when these springs break they can be readily replaced without removing the jaws from the shaft. Again, by my improved construction my cam mechanism acts upon the jaws to open them immediately and simultaneously with the withdrawing action of the closing wedge member. A feature of this cam mechanism is that each cam is hung on a pivot whereby the centrifugal force due to the rapid rotation of the shaft cannot affect its action upon the jaw arms.

Another feature of my improved construction is the provision of adjustable screws 22 which are adapted to be set inward through the arms 20 of the jaw members so that their inner ends will engage the forwardly extending portion of the levers 24 for the purpose of regulating the extent of opening of the jaws. In other words, if it were not for the screws a large portion of the contracting or closing movement of the inner ends of the levers would be taken up by the movement of their outer ends under the action of the spring 31 without affecting the opening motion of the jaws to release the work. To overcome this objection I set the screws 22 inward so that their points will engage the inner face of the levers and so reduce to the minimum the lost motion and at the same time increase to the maximum the opening motion at the work receiving end of the jaws.

I claim:

1. In a screw machine, a rotatable shaft, jaws pivotally mounted thereon and each having a rearwardly extending arm, members pivoted to the respective arms, yieldable connections between one end of each member and its respective arm, and means engaging the opposite ends of said members to move said jaws.

2. In a screw machine, a rotatable shaft, jaws pivotally mounted thereon, each jaw having a rearwardly extending arm, levers pivoted in the respective arms, means for yieldingly connecting one end of each lever to its respective arm, and means for engaging the other ends of said levers to close said jaws.

3. In a screw machine, a rotatable shaft, jaws pivotally mounted thereon, each jaw having a rearwardly extending arm, levers pivoted in the respective arms, means for engaging one end of each lever to close said jaws, and springs acting on the other ends of said levers for regulating the gripping tension of said jaws.

4. In a screw machine, a rotatable shaft, jaws pivotally mounted thereon, each jaw having a rearwardly extending arm, levers pivoted in the respective arms, means for engaging one end of each lever to close said jaws, springs acting on the other ends of said levers for regulating the gripping tension of said jaws, and means for adjusting the tension of said springs.

5. In a screw threading machine, the combination with a rotatable shaft having a longitudinal slot therein, of jaws pivotally mounted in the slotted portion of said shaft and having rearwardly extended arms, levers mounted on said arms, springs engaging said levers at one end to regulate the gripping tension on the jaws, and a wedge-shaped jaw opening member for engaging the other ends of said levers.

6. In a screw machine, a rotatable shaft, jaws pivotally mounted thereon, each jaw having a rearwardly extending arm, a yieldable lever pivoted in said arm, means for engaging one end of each of said levers to close said jaws, and means supported independently of said jaw closing means for opening said jaws as the closing means is withdrawn.

7. In a screw machine, a rotatable shaft, jaws pivotally mounted thereon, each jaw having a rearwardly extending arm, a lever pivoted in said arm, means for engaging the rear ends of said levers to spread them and close said jaws, springs acting on said levers for regulating the gripping tension of said jaws, and means supported independently of said jaw closing means for opening said jaws as the closing means is withdrawn.

8. In a screw threading machine, the combination with a rotatable shaft, a wedge-shaped jaw opening member, of a pair of screw blank engaging jaws pivotally mounted in said shaft, a rearwardly extending arm on each jaw, a lever pivoted in said arm having one end adapted to engage said wedge member and a spring acting upon the opposite end of said lever to permit it to yield and regulate the gripping tension on the jaws, and a pivoted cam acting on said arm for opening said jaws as the closing means is withdrawn.

9. In a screw threading machine, the combination with a rotatable shaft, a wedge-shaped jaw opening member, of a pair of screw blank engaging jaws pivotally mounted in said shaft, a rearwardly extending arm on each jaw, a lever pivoted in said arm having one end adapted to engage said wedge member and a spring acting upon a pin connected to the opposite end of said lever to permit the latter to yieldingly engage the said wedge member, and means for adjusting the tension of said spring.

10. In a screw threading machine, the combination with a rotatable shaft, a wedge-shaped jaw opening member, of a pair of screw blank engaging jaws pivotally mounted in said shaft, a rearwardly extending arm on each jaw, a lever pivoted in said arm having one end adapted to engage said wedge member and a spring acting upon a pin connected to the opposite end of said lever to permit the latter to yieldingly engage the said wedge member, means for adjusting the tension of said spring, and a cam pivoted in said shaft for operating on each arm to open the jaws, said cams being operated by the opening movement of said wedge member.

11. In a screw machine, a rotatable shaft, jaws pivotally mounted thereon, each jaw having a rearwardly extending arm, a yieldable lever pivoted in each arm and means for engaging said levers to close said jaws, and means carried by said arms and acting on said levers for regulating the opening movement of the jaws.

12. In a screw machine a rotatable shaft, jaws pivotally mounted therein, each jaw having a rearwardly extending arm, a lever pivoted to said arm, means for engaging one end of said levers to spread them and close said jaws, a spring acting on said levers to yieldingly engage the closing member, and means carried by said arms and acting on said levers for regulating the opening movement of the jaws.

13. In a screw machine, a rotatable shaft, jaws pivotally mounted thereon, each jaw having a rearwardly extending arm, a lever pivoted in said arm, means for engaging one end of said levers to close said jaws and a spring acting on said levers for regulating the gripping tension of said jaws, and adjusting screws carried by said arms and acting on said levers for regulating the opening movement of the jaws.

14. In a screw machine, a rotatable shaft, jaws pivotally mounted thereon, each jaw having a rearwardly extending arm, yieldable levers pivoted in said arms, means for engaging said levers to close said jaws, and adjustable screws carried by said arms and acting on said levers for regulating the opening movement of the jaws.

In testimony whereof I affix my signature in presence of two witnesses.

TEUNAUSKI Z. CARPENTER.

Witnesses:
HOWARD E. BARLOW,
E. I. OGDEN.

Copies of this patent may be obtained for five cents each, by addressing the "Commissioner of Patents, Washington, D. C."